(12) United States Patent
Mu et al.

(10) Patent No.: US 11,558,542 B1
(45) Date of Patent: Jan. 17, 2023

(54) EVENT-ASSISTED AUTOFOCUS METHODS AND APPARATUS IMPLEMENTING THE SAME

(71) Applicant: OMNIVISION TECHNOLOGIES, INC., Santa Clara, CA (US)

(72) Inventors: Bo Mu, San Jose, CA (US); Rui Jiang, Singapore (SG)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/567,308

(22) Filed: Jan. 3, 2022

(51) Int. Cl.
*H04N 5/232* (2006.01)
*G06V 10/25* (2022.01)
*G06V 20/00* (2022.01)
*G06V 10/80* (2022.01)

(52) U.S. Cl.
CPC ....... *H04N 5/232127* (2018.08); *G06V 10/25* (2022.01); *G06V 10/803* (2022.01); *G06V 20/35* (2022.01); *H04N 5/23218* (2018.08)

(58) Field of Classification Search
CPC ......... H04N 5/232127; H04N 5/23218; G06V 10/25; G06V 10/803; G06V 20/35
USPC ........................................................ 348/350
See application file for complete search history.

(56) References Cited

U.S. PATENT DOCUMENTS

| 10,096,091 | B2 * | 10/2018 | Lee ................... H04N 5/23248 |
| 11,244,464 | B2 * | 2/2022 | Srinivasan ............... G06T 5/50 |
| 11,263,751 | B2 * | 3/2022 | Saha ..................... G06V 20/13 |
| 11,303,811 | B2 * | 4/2022 | Stec ..................... G02B 27/646 |
| 2017/0140509 | A1 * | 5/2017 | Lee ................... H04N 5/23264 |
| 2018/0275242 | A1 * | 9/2018 | Peri ........................ G06T 7/292 |
| 2019/0279379 | A1 * | 9/2019 | Srinivasan ............... G06T 3/40 |
| 2020/0134827 | A1 * | 4/2020 | Saha ..................... G06V 20/13 |
| 2020/0410272 | A1 * | 12/2020 | Seo ......................... G06T 7/20 |
| 2021/0136288 | A1 * | 5/2021 | Stec ....................... G06V 10/20 |
| 2021/0350145 | A1 * | 11/2021 | Park ........................ G06T 7/70 |
| 2022/0210349 | A1 * | 6/2022 | Bong ................. H04N 5/37457 |

\* cited by examiner

*Primary Examiner* — Pritham D Prabhakher
(74) *Attorney, Agent, or Firm* — Muncy, Geissler, Olds & Lowe, P.C.

(57) ABSTRACT

A focus method and an image sensing apparatus are disclosed. The method includes capturing, by a plurality of event sensing pixels, event data of a targeted scene, wherein the event data indicates which pixels of the event sensing pixels have changes in light intensity, accumulating the event data for a predetermined time interval to obtain accumulated event data, determining whether a scene change occurs in the targeted scene according to the accumulated event data, obtaining one or more interest regions in the targeted scene according to the accumulated event data in response to the scene change, and providing at least one of the one or more interest regions for a focus operation. The image sensing apparatus comprises a plurality of image sensing pixels, a plurality of event sensing pixels, and a controller configured to perform said method.

20 Claims, 3 Drawing Sheets

EVENT-ASSISTED AUTOFOCUS METHODS AND APPARATUS IMPLEMENTING THE SAME

TECHNICAL FIELD

The present disclosure relates to autofocus methods, and more particularly, to event-assisted autofocus methods, and image sensing apparatus using said method.

BACKGROUND

A system with autofocus (hereinafter AF) capability uses a sensor, an AF processor and a mechanical or optical means to focus on an automatically or manually selected point or area, i.e. AF window. Existing AF processes are based on the input of conventional image sensors and are therefore subject to the inherent drawbacks thereof, e.g. slow response (30 or 60 frames per second, fps), low dynamic range, etc. In addition, existing AF window selection requires user intervention or long processing time.

Accordingly, it is necessary to develop a fast and reliable approach to tackle the noted problems, such that user experience could be further improved.

SUMMARY

One aspect of the present disclosure provides a focus method. The method includes capturing, by a plurality of event sensing pixels, event data of a targeted scene, wherein the event data indicates which pixels of the event sensing pixels have changes in light intensity, accumulating the event data for a predetermined time interval to obtain accumulated event data, determining whether a scene change occurs in the targeted scene according to the accumulated event data, obtaining one or more interest regions in the targeted scene according to the accumulated event data in response to the scene change, and providing at least one of the one or more interest regions for a focus operation.

One aspect of the present disclosure provides an image sensing apparatus. The image sensing apparatus includes a plurality of image sensing pixels, configured to capture a visual image of a targeted scene, a plurality of event sensing pixels, configured to capture event data of the targeted scene, wherein the event data indicates which pixels of the event sensing pixels have changes in light intensity; and a controller, configured to accumulate event data for a predetermined time interval, detect whether a scene change occurs in the targeted scene according to the accumulated event data, obtain one or more interest regions in the targeted scene according to the accumulated event data in response to the scene change, and provide at least one of the one or more interest regions for a focus operation.

Since the focus method and image sensing apparatus utilize event sensor or event sensing pixels that sense variations in light intensity in a targeted scene with no need to detect color information and absolute light intensity, faster response, higher dynamic range, less memory buffer and computation, and lower power consumption can all be achieved, thereby improving user experience.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

DETAILED DESCRIPTION

The following description of the disclosure accompanies drawings, which are incorporated in and constitute a part of this specification, and which illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

In order to make the present disclosure completely comprehensible, detailed steps and structures are provided in the following description. Obviously, implementation of the present disclosure does not limit special details known by persons skilled in the art. In addition, known structures and steps are not described in detail, so as not to unnecessarily limit the present disclosure. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
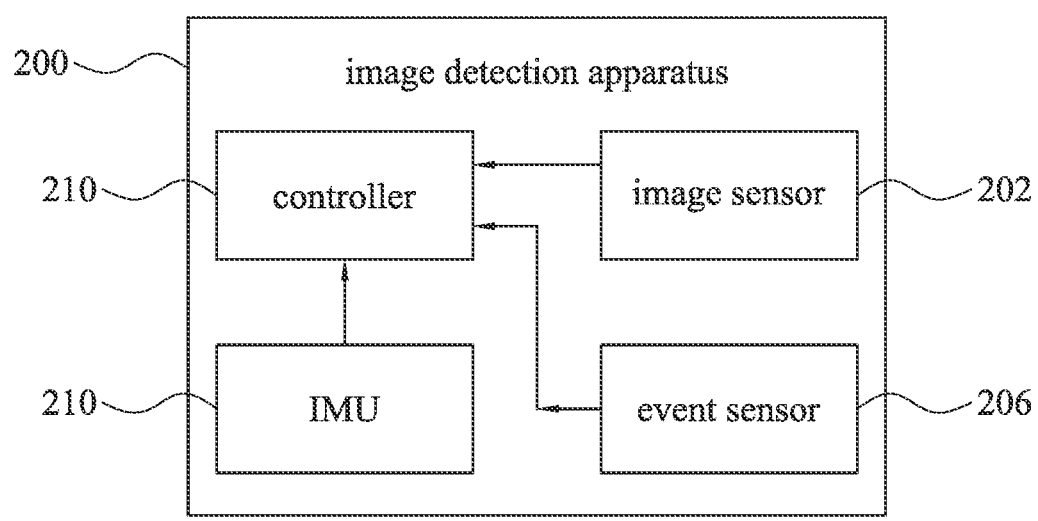
FIG. 1 shows an image sensing apparatus according to some embodiments of the present disclosure.

FIG. 1 shows an image sensing apparatus 200 in accordance with some embodiments of the instant disclosure. The image sensing apparatus 200 may be a smartphone, personal digital assistant, hand-held-computing system, tablet computer, or any electronic device employing camera and/or image capture function. In addition to an image sensor 202 including a plurality of image sensing pixels, configured to capture a visual image of a targeted scene, the image sensing apparatus 200 further incorporates an event sensor 206 including a plurality of event sensing pixels, which are configured to capture event data of the targeted scene. The event data indicates which pixels of the event sensing pixels have changes in light intensity. The image sensing apparatus 200 also includes a controller 210 that is configured to perform the steps or the methods in accordance with some embodiments of the instant disclosure, as are described in the following paragraphs with reference to FIGS. 2 and 3.

As mentioned, the event sensor 206 is used to detect variations of light intensity in a targeted scene. Whenever a subject moves, the event sensor 206 generates an event data set based on the variations in light intensity caused by the subject-moving event. For example, when a subject moves from a first position to a second position within a time period, the light intensities in the two positions will both change. In such case, an event sensing pixel of the event sensor 206 will output a first value if it senses increase in light intensity, and another event sensing pixel of the event sensor 206 will output a second value if it senses decrease in light intensity. Thus, the event data set includes coordinates of pixels experiencing changes in light intensity within such time period, and the value output by those event sensing pixels.

Since the plurality of event sensing pixels in the event sensor 206 are used to sense variations in light intensity in a scene with no need to detect the color information and the absolute light intensity, a temporal resolution of the event sensor 206 can be substantially higher than a temporal resolution (i.e., fps) of the image sensor 202. The memory usage and power consumption of the event sensor 206 can be substantially lower than that of the image sensor 202. For example, an equivalent framerate of the event sensor 206 can exceed 1000 fps. In addition, according to the design of pixels of event sensors, the event sensor 206 has an inherently high dynamic range (e.g., higher than 100 dB), which gives more advantage compared to image sensors. For example, the event sensor 206 may still function in challenging lighting conditions while the image sensor 202 may not.

Furthermore, since the event sensor 206 is mainly used to detect events, and does not need to capture a detailed image of the targeted scene, the event sensor 206 may require lower spatial resolution than the image sensor 202.

In some embodiments, the event sensor 206 and the image sensor 202 are independently configured in the image sensing apparatus 200. In some embodiments, the plurality of event sensing pixels and the plurality of image sensing pixels can be formed together as a hybrid structure, thereby simplifying the installment of the image sensing apparatus 200.

In some embodiments, the image sensing apparatus 202 can further include an inertial measurement unit (IMU) 212. The IMU 212 may contain a combination of accelerometers and gyroscopes to obtain an inertial measurement result with respect to a subject where the IMU 212 is located. For example, the inertial measurement result obtained from the IMU 212 may represent the movement information of the image sensing apparatus 200.

Figure 2:
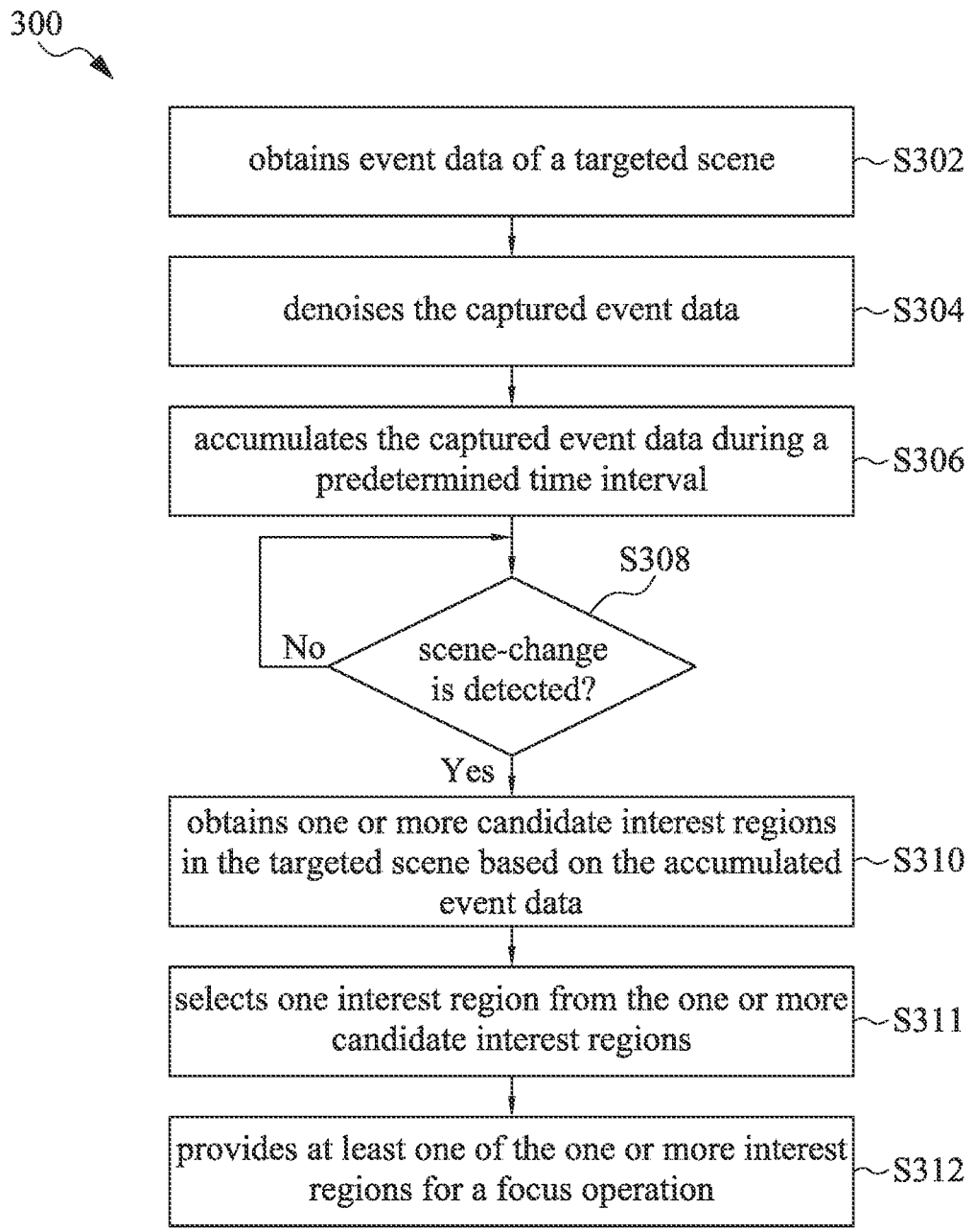
FIG. 2 is a flowchart of a focus method according to some embodiments of the present disclosure.

FIG. 2 is a flowchart of a method 300 in accordance with some embodiments of the instant disclosure. The steps of the method 300 are executed by the controller 210 through the use of the event sensor 206, so as to execute the autofocus method. In some embodiments, outputs of the image sensor 202 and the IMU 212 may be used as auxiliary information to further improve performance of the autofocus method.

In step S302, the controller 210 obtains the event data of a targeted scene captured by the event sensor 206. As mentioned, the event data indicates which pixels of the event sensing pixels have changes in light intensity.

In step S304, the controller 210 performs a denoising operation on the captured event data. The detailed embodiment of the denoising operation may be adjusted according to the actual situation and is not a limitation of the present disclosure. In some embodiments, step S304 may be omitted.

In step S306, the controller 210 collects and accumulates the captured event data (or the denoised event data, if step S304 is performed) during a predetermined time interval, for example, five microseconds, to obtain accumulated event data. By using the accumulated value of the event data within the predetermined time interval instead of event data captured at a single moment, it is easier for the controller 210 to identify the situation of the scene change, and to filter out minor or insignificant events not qualified as a scene change. For example, the accumulated event data for a fast and continuous moving (during the observation time) subject can be higher than that of a slow or non-continuous moving subject. If a subject moves too slowly or for too short period for the accumulated event data of said subject to meet a predetermined threshold value, the movement will not be defined as a scene change. In other words, accumulation of captured event data makes it easier to define a moving subject and further observe the path of movement.

In another example, a small subject continuously moving during the predetermined time interval may not be ignored due to variations in light intensity during accumulation, which may offset the consideration of small size. A challenging scenario in which a small subject moves in the field of view can be overcome.

In step S308, based on the accumulated event data, the controller 210 detects or determines whether a scene change occurs in the targeted scene. If no scene change is detected, step S310 will not be entered or performed. In other words, the scene-change detection in step S308 will continue until a scene change is detected.

In some embodiments, detection or determination in step S308 may be performed by further referring to a degree of difference between the visual images captured at different time points by the image sensor 202. For example, the controller 210 may further obtain a motion detection result according to the visual images to improve the accuracy of the detection or determination of step S308.

In some embodiments, the detection or determination in step S308 may be performed by further referring to the inertial measurement result obtained from the IMU 212 to improve the accuracy of the detection or determination of step S308. For example, when image sensing apparatus 200 itself is constantly moving, the accumulated event data in step S306 may be high for all pixels over the targeted scene. Once this situation is detected by the IMU 212, the threshold value of scene-change detection in step S308 may be set higher accordingly.

Step S310 will be entered if a scene change is detected in step S308, at which time the controller 210 is required to obtain one or more candidate interest regions in the targeted scene based on the accumulated event data. For example, a region with significant movement may be selected as a candidate interest region.

In step S311, the controller 210 selects one interest region from the obtained candidate interest regions in the targeted scene. In some scenarios, the selection of step S311 may be optional. For example, when there is only one candidate interest region, selection among the obtained one or more candidate interest regions is not necessary. Depending on need, the selection can be based on different criteria or voting algorithms. A mechanism of selection according to some embodiments of the present disclosure is further described in the following paragraphs with reference to FIG. 4.

In step S312, the selected interest region is provided. The selected interest region may be at least for the image sensing apparatus 200 to perform a focus operation. In some embodiments, the selected interest region may be used by the image sensing apparatus 200 to perform other operations, such as Auto-Exposure (AE) or Auto-White Balance (AWB).

Figure 3:
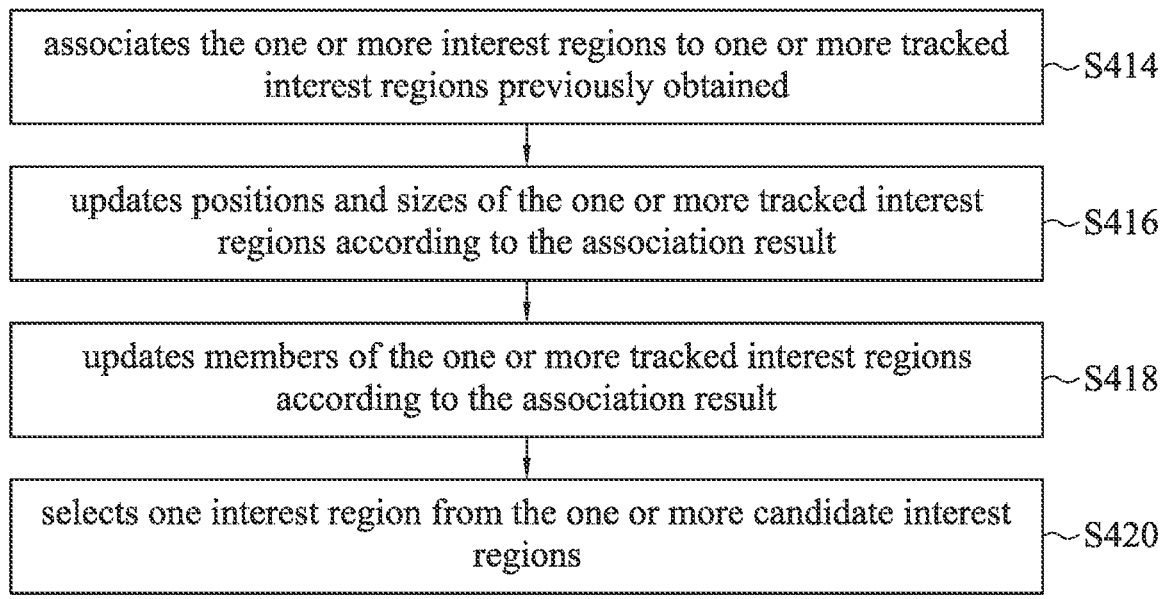
FIG. 3 is a flowchart of another focus method according to some embodiments of the present disclosure.

FIG. 3 shows sub-steps of the selection described in step S311 according to some embodiments of the present disclosure. The selection is usually based on multiple factors. Depending on need, the selection may be based on a single factor or the weight of the multiple factors can be different. The multiple factors may include the position, the size, and the intensity of motion of the one or more candidate interest regions. In general, a candidate interest region having a position closer to the center of the field of view, larger size, and greater intensity of motion will have more chance to be selected as the final interest region.

In step S414, the controller 210 stores the obtained one or more interest regions in storage (not depicted in FIG. 1) and associates the newly obtained one or more interest regions with the stored (i.e., previously obtained) one or more interest regions. Using a billiard game setup as an example, when both a white ball and a red ball are obtained as an interest region in the current scene and in the previous scene, the controller 210 will associate the white ball in the current scene with the white ball in the previous scene and associate the red ball in the current scene with the red ball in the previous scene.

In step S416, based on the association result in step S414, the controller 210 updates the position and size of the stored one or more interest regions.

In step S418, the controller 210 updates the members of the stored one or more interest regions. Said member update includes deleting obsolete interest regions and creating new interest regions. For example, in the previous billiard scenario, if the white ball moves out of the field of view and a blue ball enters, the controller 210 will delete the white ball from the stored one or more interest regions and make the newly entered blue ball a new member of the stored one or more interest regions.

In step S420, similar to step S312, members of the stored one or more interest regions are candidate interest regions, wherein one thereof may need to be selected as the final interest region. Conditions and descriptions relevant to step S312, especially the selecting factors and standards, may apply to step S420.

Compared to conventional focus methods requiring user intervention (e.g., touchscreen entry), the instant disclosure proposes an autofocus method requiring none. By employing information from the event sensor, faster response, higher dynamic range, less memory buffer and computation, and reduced power consumption can all be achieved. In addition, the scene-change detection and the selection among interest regions is be more accurate and robust. User experience can be significantly improved.

As mentioned, the proposed method can also be applied to other tasks such as Auto-Exposure (AE), Auto-White Balance (AWB), etc. For example, the purpose of white balance is to properly display the white objects in the targeted scene. In general, when variations of light intensity are detected, the applied white balance might need to be modified. In the context of using an event sensor as described in the aforementioned embodiments, since a more accurate interest region is selected or obtained, the illumination or the variations of light intensity of the selected interest region could be used to determine a more accurate white balance.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A focus method, comprising:
   capturing, by a plurality of event sensing pixels, event data of a targeted scene, wherein the event data indicates which pixels of the event sensing pixels have changes in light intensity;
   accumulating the event data for a predetermined time interval to obtain accumulated event data;
   determining whether a scene change occurs in the targeted scene according to the accumulated event data;
   in response to occurring of the scene change, obtaining one or more interest regions in the targeted scene according to the accumulated event data; and
   providing at least one of the one or more interest regions for a focus operation.

2. The method of claim 1, wherein determining whether the scene change occurs in the targeted scene according to the accumulated event data comprises:
   capturing, by a plurality of image sensing pixels, a first visual image of the targeted scene at a first time;
   capturing, by the image sensing pixels, a second visual image of the targeted scene at a second time;
   determining whether the scene change occurs in the targeted scene further according to a difference between the first visual image and the second visual image.

3. The method of claim 1, further comprising obtaining, by an inertial measurement unit (IMU), an inertial measurement result with respect to the event sensing pixels.

4. The method of claim 3, wherein determining whether the scene change occurs in the targeted scene according to the accumulated event data comprises determining whether the scene change occurs in the targeted scene further according to the inertial measurement result.

5. The method of claim 1, wherein providing the at least one of the one or more interest regions for the focus operation comprises selecting one interest region from the one or more interest regions for the focus operation.

6. The method of claim 5, wherein selecting the one interest region from the one or more interest regions comprises selecting the one interest region from the one or more interest regions based on a position of each of the one or more interest regions.

7. The method of claim 5, wherein selecting the one interest region from the one or more interest regions comprises selecting the one interest region from the one or more interest regions based on a size of each of the one or more interest regions.

8. The method of claim 5, wherein selecting the one interest region from the one or more interest regions comprises selecting the one interest region from the one or more interest regions based on intensity of motion of each of the one or more interest regions.

9. The method of claim 1, further comprising associating the one or more interest regions to one or more tracked interest regions previously obtained.

10. The method of claim 9, further comprising updating positions and sizes of the one or more tracked interest regions according to the association result.

11. The method of claim 10, further including updating members of the one or more tracked interest regions according to the association result.

12. The method of claim 11, wherein providing the at least one of the one or more interest regions for the focus operation comprises selecting one interest region from the one or more tracked interest regions for the focus operation.

13. The method of claim 1, further comprising performing a denoising operation upon the event data.

14. An image sensing apparatus, comprising:
- a plurality of image sensing pixels, configured to capturing a visual image of a targeted scene;
- a plurality of event sensing pixels, configured to capture event data of the targeted scene, wherein the event data indicates which pixels of the event sensing pixels have changes in light intensity; and
- a controller, configured to:
    - accumulating the event data for a predetermined time interval to obtain accumulated event data;
    - determining whether a scene change occurs in the targeted scene according to the accumulated event data;
    - in response to occurring of the scene change, obtaining one or more interest regions in the targeted scene according to the accumulated event data; and
    - providing at least one of the one or more interest regions for a focus operation.

15. The image sensing apparatus of claim 14, wherein the controller detects whether the scene change occurs in the targeted scene further according to the visual image.

16. The image sensing apparatus of claim 14, further comprising:
- an inertial measurement unit (IMU), configured to obtain an inertial measurement result with respect to the image sensing apparatus; and
- wherein the controller detects whether the scene change occurs in the targeted scene further according to the inertial measurement result.

17. The image sensing apparatus of claim 14, wherein the controller is further configured to select one interest region from the one or more interest regions for the focus operation.

18. The image sensing apparatus of claim 17, wherein the controller is further configured to select the one interest region from the one or more interest regions based on a position, a size, or intensity of motion of each of the one or more interest regions.

19. The image sensing apparatus of claim 14, wherein the controller is further configured to:
- associate the one or more interest regions to one or more tracked interest regions previously obtained;
- update positions and sizes of the one or more tracked interest regions according to the association result; and
- update members of the one or more tracked interest regions according to the association result.

20. The image sensing apparatus of claim 14, wherein the image sensing pixels and the event sensing pixels are formed together as a hybrid structure.

* * * * *